(No Model.) 2 Sheets—Sheet 2.

J. A. FULLERTON.
CORN PLANTER.

No. 395,970. Patented Jan. 8, 1889.

Witnesses:
E. P. Ellis,
L. L. Burket.

Inventor:
J. A. Fullerton,
per
J. A. Lehmann,
Atty.

N. PETERS, Photo-Lithographer, Washington, D. C.

UNITED STATES PATENT OFFICE.

JAMES AMASA FULLERTON, OF MOUNTS, INDIANA.

CORN-PLANTER.

SPECIFICATION forming part of Letters Patent No. 395,970, dated January 8, 1889.

Application filed October 8, 1888. Serial No. 287,474. (No model.)

*To all whom it may concern:*

Be it known that I, JAMES AMASA FULLERTON, of Mounts, in the county of Gibson and State of Indiana, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination, with the driving-wheel, of a cog-wheel which is secured to the axle, a smaller cog-wheel which gears with the one secured to the axle, a revolving arm or lever secured to the end of the axle upon which the smaller cog-wheel is placed, a wheel or ratchet with which the two ends of the arms alternately engage, the axle upon which the wheel or ratchet is secured, an operating-wheel secured to one end of the axle for operating the pinion which gives motion to the crank which operates the seed-slide, and a wheel secured to the other end of the axle which operates the markers, as will be more fully described hereinafter.

The object of my invention is to produce a corn-planter in which the parts are operated by the revolution of one of the driving-wheels, and in which the same shaft is made to operate the seed-slide and the two markers.

Figure 1:
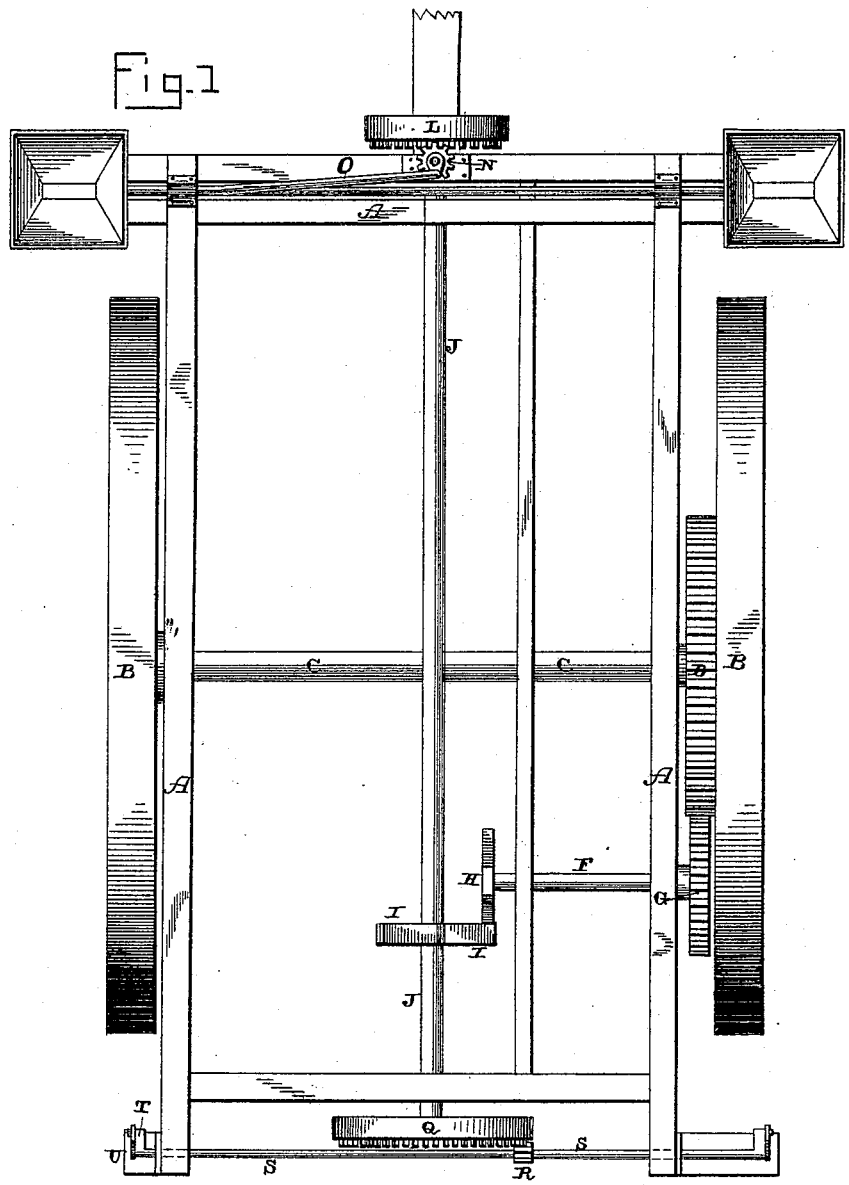
Figure 2:
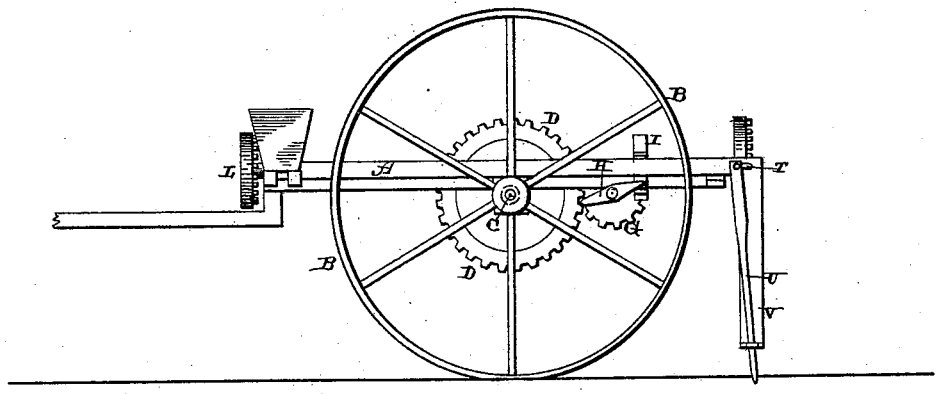
Figure 3:
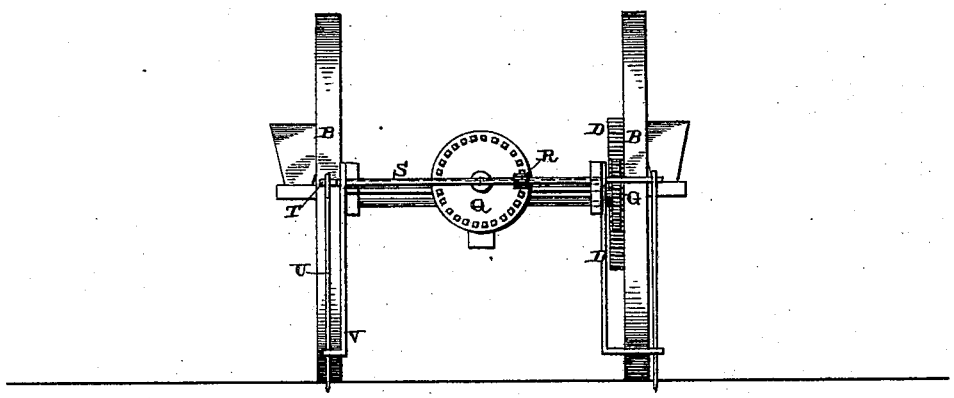

Figure 1 is a plan view of a planter which embodies my invention. Fig. 2 is a side elevation. Fig. 3 is a rear end view.

A represents a suitable frame, which is supported upon the two driving-wheels B in the usual manner. These driving-wheels are secured to the axle C, and to one of the wheels is secured a cog-wheel, D. Extending partially across the frame A, parallel with the axle C, is a second short axle, F, to which a smaller cog-wheel, G, is secured, and which meshes with the one D. The larger cog-wheel has, preferably, fifty-five teeth, and the one G is to have forty-four teeth, or just four-fifths of the number upon the wheel D. To the inner end of the axle F is secured an arm or lever, H, which, as it is made to revolve, has its ends to alternately strike against the five-pronged wheel or ratchet I, so as to cause the shaft J, to which the wheel or ratchet is secured, to revolve just one-fifth around. This wheel or ratchet I is moved just far enough each time by the lever or arm H to bring a new tooth or prong into position to be operated, and then the shaft J remains stationary.

To the front end of this shaft J is secured the wheel L, which has teeth formed upon its rear side, and which operates the pinion N, which is mounted upon the top of the frame, and which has the crank O projecting above its top. This crank engages with the seed-slide and operates it each time the pinion is made to revolve. The wheel L has, preferably, twenty-five cogs, and is turned one-fifth around each time the wheel or ratchet I is operated by the arm H, and the pinion N has, preferably, ten cogs, so as to be turned one-half around at each operation. At the first operation of the wheel L the pinion N is turned one-half around, so that the crank O will drive the seed-slide in one direction, and then in the next operation the seed-slide is moved in the opposite direction, a suitable rest being given between the operations to allow the machine to be moved forward a distance between the hills.

To the rear end of the shaft J is secured the large wheel Q, which meshes with the pinion R on the shaft S, which extends horizontally across the rear end of the frame. Upon each end of this shaft S is secured a crank, T, and to each crank T is connected a vertically-moving rod, U, which projects down through a guide, V, secured to the frame. At each revolution of the shaft S the rods U are made to mark the ground where the hills of corn have been dropped and just in the rear of the driving-wheels. This shaft S is intended to be thrown out of gear whenever so desired, so that the hill-markers can be stopped at any time.

Having thus described my invention, I claim—

1. The combination of the driving-wheel, the axle upon which it is placed, the cog-wheel D, secured to the axle, the axle F, the cog-wheel G, secured thereto, the arm or lever H, secured to the end of the shaft F, the shaft J, the wheel or ratchet I, secured to the shaft J, the wheel L, secured to the front end of the shaft J, the pinion N, and the crank O for operating the seed-slide, substantially as shown.

2. The combination of the shaft J, provided with the wheel or ratchet I, and the arm or lever H and its operating mechanism for operating the shaft J, with the wheel Q, secured to the rear end of the shaft, the shaft S, pinion R, secured to the shaft, the cranks T upon the ends of the shaft S, the markers U, and the guides V, secured to the frame through which the markers operate, substantially as described.

In testimony whereof I affix my signature in presence of two witnesses.

JAMES AMASA FULLERTON.

Witnesses:
W. H. PEEK,
CLEM PEEK.